P. A. LIBBY.
TREE PROTECTOR.
APPLICATION FILED MAR. 25, 1920.
1,353,404.
Patented Sept. 21, 1920.
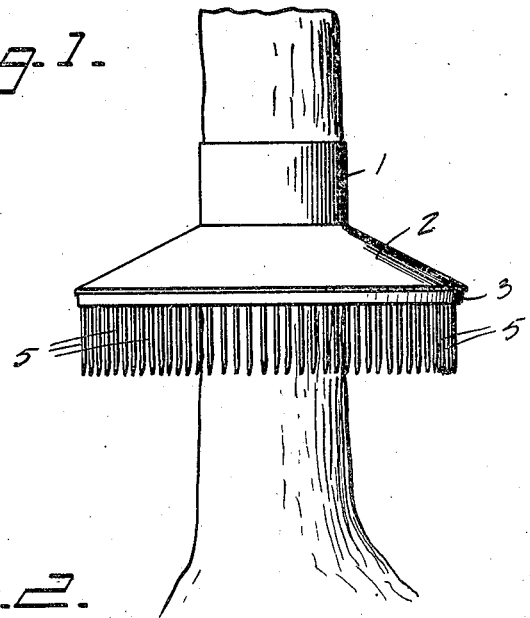
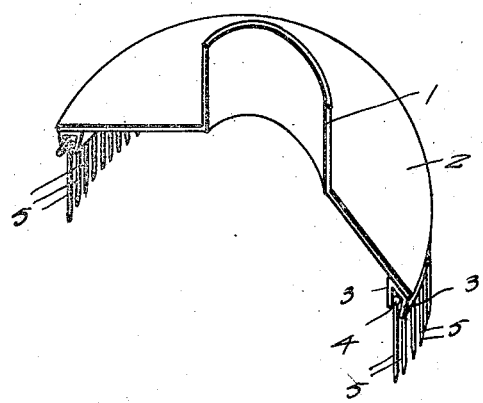
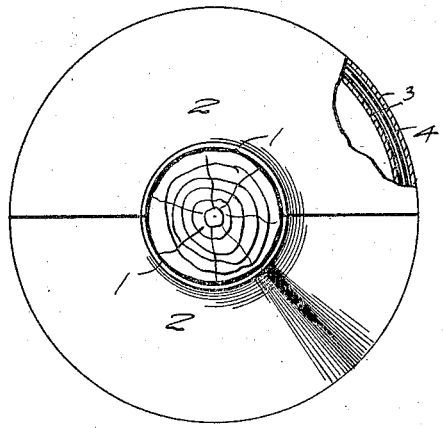
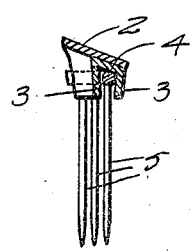
Inventor
P. A. Libby

UNITED STATES PATENT OFFICE.

PEARL A. LIBBY, OF WALDOBORO, MAINE.

TREE-PROTECTOR.

1,353,404. Specification of Letters Patent. Patented Sept. 21, 1920.

Application filed March 25, 1920. Serial No. 368,592.

*To all whom it may concern:*

Be it known that I, PEARL A. LIBBY, a citizen of the United States, residing at Waldoboro, in the county of Lincoln and State of Maine, have invented certain new and useful Improvements in Tree-Protectors; and I do hereby declare the following to be a full, clear, and exact description of the invention, such as will enable others skilled in the art to which it appertains to make and use the same.

This invention relates to tree protectors and it consists in the novel features hereinafter described and claimed.

An object of the invention is to provide a protector of the character stated adapted to be applied to the trunk of a tree below the limbs thereof and which when in position upon the trunk will serve as a barrier preventing crawling insects and worms from passing up the trunk of the tree to the limbs thereof and out and destroying the foliage.

With this object in view, the protector comprises sections adapted to be applied to the opposite side portions of the trunk of the tree and secured thereon in any suitable manner. The sections are provided with collar portions adapted to bear against the tree trunk and skirt portions which stand out from the tree trunk and which are downwardly and outwardly inclined. The skirt portions carry at their outer edges and at their under sides spaced flanges adapted to receive between them the barrier element. The barrier elements comprise rods adapted to be passed between the flanges and downwardly disposed pointed pins mounted upon the rods, said pins being spaced from each other and serving as the positive or active barrier of the attachment for preventing the progress of the worms and insects as hereinbefore stated.

In the accompanying drawing:—

Figure 1 is a side elevation showing the tree protector applied,

Fig. 2 is a perspective view of one of the sections of the tree protector.

Fig. 3 is a top plan view of the tree protector with parts broken away and parts in section.

Fig. 4 is a detailed fragmentary sectional view of the tree protector.

As hereinbefore stated, the tree protector is applied to the trunk of a tree below the branches thereof and is intended and designed to prevent crawling insects and worms, caterpillars and the like from ascending the trunk of the tree and crawling out on the branches thereof and attacking the foliage.

The tree protector comprises sections which are applied to the opposite sides of the trunk of the tree, each section includes a semi-collar or cylindrical portion 1 adapted to be applied directly to the side of the tree and an outstanding skirt portion 2 attached at its inner edge to the lower edge of the collar. Said skirt portion is outwardly and downwardly inclined. Spaced flanges 3 are carried at the outer portion of the skirt and at the under side thereof. The said flanges are downwardly inclined toward each other, or converge toward each other from their upper portions to their lower portions. These flanges may be formed from a single strip of metal having its intermediate portion soldered to the skirt and its edge portions forming the flanges proper.

Each protector section also includes a barrier section or member. The barrier section or member includes a pliable rod 4 adapted to be slipped between the flanges 3 and pins 5 are attached at their upper ends to the rods and extend downwardly below the lower edges of the flanges. Said pins are spaced from each other and their pointed ends are lowermost when the barrier member is in position upon the skirt portion of the protector section.

Consequently when two or more of the protector sections are applied to the trunk of a tree and completely surround the same, the insects or worms which crawl up the trunk of the tree encounter the underside of the skirt sections. They must then crawl in a downward direction along the under surface of the skirt section and inasmuch as this section is smooth, they will have difficulty in making progress and may fall to the ground when they will have to begin the climbing operation again. Should they succeed in passing over the smooth surface of the skirt portion they will encounter the pins and must pass down and around the pointed ends thereof. In attempting to do this they will lose grip or hold upon the pins inasmuch as they are smooth and when they arrive at the pointed ends they will fall by gravity from the protector to the ground.

Having thus described the invention, what is claimed is:

A protector comprising a section, means for applying the section to a tree, spaced flanges carried by the section and being downwardly inclined toward each other, a rod adapted to slip between the flanges and spaced pins carried by the rod.

In testimony whereof I affix my signature in presence of two witnesses.

PEARL A. LIBBY.

Witnesses:
 HADLEY H. KUHN,
 M. I. RICHARDSON.